Nov. 25, 1958 — W. ROTH — 2,861,445

PHOTOFLASH LIGHT SOURCE

Filed Jan. 29, 1957

Inventor:
Walter Roth,
by Paul A. Frank
His Attorney.

United States Patent Office 2,861,445
Patented Nov. 25, 1958

2,861,445

PHOTOFLASH LIGHT SOURCE

Walter Roth, Schenectady, N. Y., assignor to General Electric Company, a corporation of New York Application January 29, 1957, Serial No. 636,977

5 Claims. (Cl. 67—87)

The present invention relates to photoflash light sources. More particularly, the invention relates to photoflash light sources wherein a sudden flash of actinic light is produced by the combustive chemical reaction between a mixture of gases.

Many and diverse types of photoflash light sources are presently available. Presently available photoflash light sources are satisfactory to produce actinic light for photographic purposes for a number of specific uses. There is, however, an existing need in the photographic art for photoflash light sources which produce an intense flash of actinic light immediately upon the ignition of the combustible light producing substance, which flash of light is of extremely short duration. One instance in which this need arises is when the object to be photographed is moving rapidly with respect to the camera with which a photograph is to be taken. Another instance in which this need arises is that of night aerial photography. In night aerial photography the aircraft from which photographs are to be taken is moving rapidly with respect to the object to be photographed, in many instances the terrain over which the aircraft is flying. In addition to the linear velocity of the aircraft with respect to the terrain, the aircraft is often undergoing vertical and lateral movements due to turbulent air currents. In this instance, if a photoflash light source is utilized which has a long-time duration or which does not produce light instantaneously upon ignition, but requires a period of "build-up" before maximum intensity is attained, relative motion between the aircraft and the terrain to be photographed may produce a blurred image. It is readily apparent therefore that in such instances as night aerial photography, the important criterion upon which the suitability of a photoflash light source depends is often the sharpness of the peak of the instantaneous flash of light and the short duration thereof obtainable from the light source rather than the time-integrated light output. Any reasonable shortcomings of a very fast light source with respect to integrated light output may be overcome by the use of very fast films.

Accordingly, one object of the invention is to provide a photoflash light source utilizing a novel mixture of combustible gases.

Another object of the invention is to provide a photoflash light source which produces a sharply-peaked short time-duration flash of actinic light immediately upon the ignition thereof.

A further object of the invention is to provide a photoflash light source of great utility in night aerial photography.

In accord with the broad aspect of my invention I provide a photoflash light source including a sealed impervious vessel containing therein a mixture of diborane and one or more gaseous oxides of nitrogen. Means are also provided to initiate a combustive reaction between the gaseous mixture. Upon the initiation of combustion, a brilliant flash of actinic light is instantaneously obtained. This flash of light rises almost instantaneously to its maximum intensity and disappears in an extremely short period of time.

The novel features believed characteristic of the invention are set forth in the appended claims. The invention itself, however, together with further objects and advantages thereof may best be understood with reference to the following description taken in connection with the drawing in which;

Figure 1:
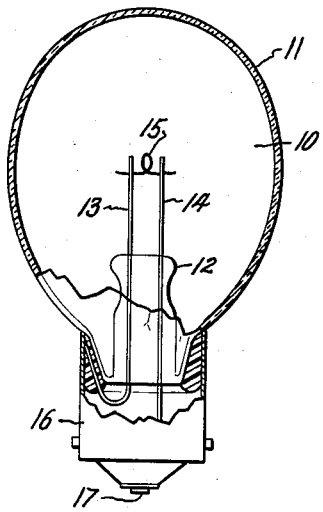
Figure 1 represents a photoflash light source constructed in accord with the invention.

In Figure 1 of the drawing the invention is shown embodied in a photoflash bulb adapted for normal photoflash photography uses. In Figure 1 photoflash bulb 10 comprises a sealed impervious vessel which may be evacuable transparent envelope 11 which may be of glass, quartz, or other transparent vitreous material, having a re-entrant portion 12 through which lead-in conductors 13 and 14 enter bulb 10. Lamp filament 15 is deposed in the approximate center of bulb 10 between lead wires 13 and 14 and may be in the form of a single filament, a filament having a loop therein, or a filament in the form of a helix. Filament conductor 13 is electrically connected to bulb base member 16 and filament conductor 14 is electrically connected to base terminal cap 17, electrically insulated from base member 16. Electrical energy for causing the ignition of the bulb is applied between base member 16 and base cap 17. Filament conductors 13 and 14 may be constructed of any high conductivity metal and are preferably made of copper or copper alloys. Filament 15 is made of a high melting-point, high resistance metal as for example tungsten. In order that filament 15 may become incandescent and fracture in a very short time, thus igniting the charge within envelope 10, wire 15 is preferably less than 0.001 inch in diameter.

In the practice of the invention, the interior of bulb 10 is filled with a mixture of diborane ($B_2H_6$) and one or more stable gaseous oxides of nitrogen which may conveniently be NO, $N_2O$, or $NO_2$ or mixtures thereof. I have found that the exothermic reaction of diborane and gaseous oxides of nitrogen results in a brilliant greenish-white flash of actinic light. This exothermic reaction occurs with a useful light emission over a wide range of pressures and a wide range of mixtures between the constituent gases. Useful light emission from the reaction of diborane with gaseous oxides of nitrogen may be obtained at pressures as low as one-third of an atmosphere. There does not appear to be any upper limit to the bulb pressure at which useful light output may be attained. The limiting factor upon the use of this mixture of gases at higher pressures is the possibility of fracture of vitreous envelope 11 upon the ignition of the gaseous mixture. Accordingly for transparent vitreous envelopes such as illustrated in Figure 1 designed for conventional photographic uses, as for example, household photography, the pressure of the gaseous mixture within envelope 10 should not exceed one atmosphere.

Diborane and gaseous oxides of nitrogen may be mixed in a wide range of proportions in the manufacture of photoflash lamps in accord with the invention. I have found, however, that the most useful light intensity may be obtained within a range of one part diborane mixed with three to twelve parts of a gaseous oxide of nitrogen by volume. The most efficient light emitting mixture is one part diborane to approximately 6 parts of gaseous oxide or oxides of nitrogen by volume. A characteristic of the gaseous mixtures of the invention, is that as the proportion of the gaseous oxide or oxides of nitrogen is increased relative to the diborane present, the resultant chemical reaction is less prone to produce pressure "build-up" within the envelope and consequently is less likely to fracture the envelope within which the gases are contained. Therefore, although the preferred range of constituent mixtures is one part diborane mixed with three to twelve parts by volume of a gaseous oxide or oxides of nitrogen, higher proportions than 12 to 1 may be utilized at higher pressures without causing fracture of the bulb and yet achieving a useful light output. This is due to the fact that in the photoflash light sources of the invention, light intensity is proportional to $P^{1/2}$ where $P$ is the gas pressure.

The empirical formula describing the intensity of light emitted by the reaction of diborane and gaseous oxides of nitrogen is illustrated by the relationship which governs the intensity of light emitted by the reaction of diborane with nitric oxide (NO). This relationship is;

$$I = \frac{KP^{1/2}f_{NO}^2}{(f_{NO} + 5f_{B_2H_6})^{3/2}}$$

where $K$ = a constant for each mixture composition
$P$ = the total mixture pressure
$f_{NO}$ = the mole fraction of NO present
$f_{B_2H_6}$ = the mole fraction of $B_2H_6$ present
$I$ = the intensity in arbitrary units The above equation may be used to compute the optimum pressures to be utilized to produce the highest intensity of emitted light utilizing various proportions of nitric oxide and diborane.

Photoflash light sources constructed in accord with the present invention are productive of extremely highly peaked, extremely short duration pulses of actinic light. Thus, for example, whereas a conventional shredded aluminum flashbulb, useful in household photography, exhibits an intensity versus time characteristic wherein the intensity of the light output begins to increase at 10 milliseconds after ignition and continues until approximately 40 milliseconds after ignition, peaking at approximately 20 milliseconds after ignition, photoflash lamps such as illustrated in Figure 1 of the drawing peak at less than 1 millisecond after ignition and the entire pulse of light disappears at approximately 5 milliseconds after ignition.

One device constructed in accord with the invention comprised a photoflash lamp as illustrated in Figure 1 of the drawing. The bulb was constructed of glass and enclosed a volume of approximately 25 cubic centimeters. This volume was filled with a mixture of 1 part diborane to 6 parts by volume of nitric oxide at a pressure of 45 centimeters of mercury. The bulb filament was a straight tungsten wire approximately 0.002 millimeter in diameter and 5 millimeters long. This bulb was tested in comparison with a conventional photoflash lamp containing shredded aluminum in which the charge contained the same potential energy of combustion. Although the total integrated light output of the aluminum photoflash lamp was approximately 5½ times greater than the diborane-nitric oxide bulb, the latter exhibited a peak intensity 1.8 times greater than the aluminum flash lamp and the flash thereof had a time duration approximately only ⅙ as long as the former. This characteristic makes photoflash light sources constructed in accord with the invention ideally suited for uses in which a high intensity, short-duration flash of actinic light is desired, as for example in night aerial photography.

Figure 2:
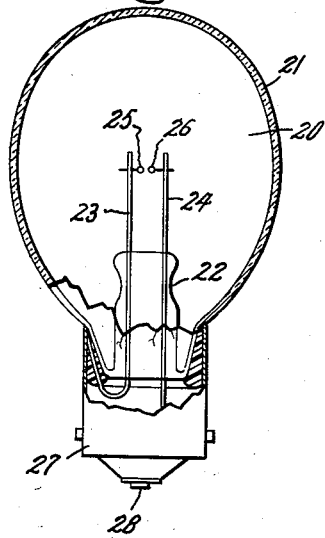
Figure 2 represents an alternative embodiment of the invention.

In Figure 2 of the drawing there is illustrated an alternative embodiment to the photoflash bulb illustrated in Figure 1. In Figure 2 photoflash lamp 20 includes a sealed impervious vessel which may be transparent envelope 21 having a re-entrant portion 22, through which lead-in wires 23 and 24 enter bulb 20. Secured to the interior ends of lead-in wires 23 and 24, are a pair of spark electrodes 25 and 26 approximately 1 millimeter distant from one another. Lead-in wire 23 is connected to bulb base member 27 and lead-in wire 24 is connected to base terminal cap 28. The photoflash bulb of Figure 2 may be ignited by a pulsed voltage signal which causes the build-up of a high voltage between spark electrodes 25 and 26, causing a spark thereacross which ignites the gaseous mixture contained within bulb 20.

Figure 3:
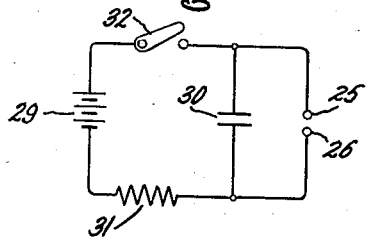
Figure 3 is a schematic representation of a means for initiating pulsed voltage to produce a flash of actinic light utilizing the embodiment of Figure 2.

A simple schematic circuit illustrating one means for causing a spark to be generated between spark electrodes 25 and 26 is illustrated in Figure 3 of the drawing. In Figure 3 a source of unidirectional voltage is represented by battery 29 which charges condenser 30 through a resistance 31. The sparking is initiated by closing switch 32. Upon closing switch 32 capacitor 30 charges through resistance 31, and, when capacitor 30 has reached full charge, a spark breakdown occurs between spark electrodes 25 and 26. In a typical circuit, as illustrated in Figure 3, battery 29 may be a three volt battery, capacitor 30 may be a 500 microfarad capacitor, resistance 31 may be a one megohm resistance, and spark gap between electrodes 25 and 26 may have a distance of approximately one millimeter.

The photoflash bulb of Figure 2 is charged with a gaseous mixture of diborane ($B_2H_6$) and a gaseous oxide of nitrogen within the pressure and proportion ranges as described with respect to the device of Figure 1. The materials used to construct the bulb may be the same as those utilized to construct the device of Figure 1. Spark electrodes 25 and 26 may comprise any material conventionally used for spark electrode as for example brass, bronze, etc.

As is mentioned hereinbefore, the only limitation to the higher pressures which may be utilized in charging photoflash light sources in accord with the invention utilizing the mixture of diborane with gaseous oxides of nitrogen, lies in the fact that, at high pressures, sufficient pressure is generated to fracture the bulb envelope. This characteristic may be utilized to advantage to provide improved high-intensity, short-duration flashes of actinic light for uses other than household photography wherein bulb fracture need not be avoided.

Thus, for example, in night aerial photography, extremely high pressures up to 38 atmospheres, the critical pressure of diborane, may be utilized to charge the photoflash bulb envelope. As soon as the gaseous mixture is ignited, a great expansion of the volume of gas contained in the bulb occurs causing the fracture of the bulb envelope. In uses such as aerial night photography, where the fracture of the bulb envelope does not result in any deleterious effects, this fracture is not undesirable. In fact, fracture of the bulb makes it possible that the material from which the bulb envelope is constructed need not be transparent since, immediately upon fracture, the light generated by the gaseous reaction passes out of the bulb envelope and illuminates the object to be photographed. Accordingly, it is within the scope of the present invention that for uses wherein fracture of the bulb envelope is not to be avoided, high pressures ranging up to 38 atmospheres may be utilized and the impervious vessel utilized need not be transparent. It is only necessary in this instance that the vessel be able to withstand the pressure at which gaseous mixture exists prior to initiation of combustion between diborane and the gaseous oxide of nitrogen, but yet fracture when the gaseous mixture is ignited. Such a vessel may be made of thick, annealed, Pyrex glass or like substances.

While the invention has been disclosed with respect to specific embodiments thereof, many changes and modifications will immediately occur to those skilled in the art without departing from the invention. Accordingly I intend by the appended claims to cover all such changes and modifications as fall within the true spirit and scope of the foregoing disclosure.

What I claim as new and desire to secure by Letters Patent of the United States is:

1. A photoflash light source comprising a sealed impervious vessel, a combustible light-producing charge within said vessel, said charge comprising a mixture of ignitable proportions of diborane and a gaseous oxide of nitrogen, and means within said envelope for igniting said charge.

2. A photoflash light source comprising a sealed impervious vessel, a combustible light-producing charge within said vessel, said charge comprising a mixture of ignitable proportions of diborane and a gas selected from the group consisting of NO, $N_2O$, and $NO_2$, and means within said envelope for igniting said charge.

3. A photoflash light source comprising a sealed impervious vessel, a combustible light-producing charge within said vessel, said charge comprising a mixture of one part diborane and three to twelve parts by volume of a gaseous oxide of nitrogen, and means within said envelope for igniting said charge.

4. A photoflash light source comprising a transparent evacuable envelope, a combustible light-producing charge within said vessel, said charge comprising a mixture of ignitable proportions of diborane and a gaseous oxide of nitrogen, and means within said vessel for igniting said charge.

5. A photoflash light source comprising a transparent evacuable envelope, a combustible light-producing charge within said envelope, said charge comprising a mixture of one part diborane and from three to twelve parts by volume of a gaseous oxide of nitrogen, and means within said envelope for igniting said charge.

References Cited in the file of this patent

UNITED STATES PATENTS

| 1,989,572 | Van Liempt | Jan. 29, 1935 |
| 2,071,369 | Williams | Feb. 23, 1937 |